United States Patent
Hirao

(10) Patent No.: US 12,060,933 B2
(45) Date of Patent: Aug. 13, 2024

(54) VEHICLE

(71) Applicant: SUBARU CORPORATION, Tokyo (JP)

(72) Inventor: Koichi Hirao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/242,049

(22) Filed: Sep. 5, 2023

(65) Prior Publication Data

US 2024/0084889 A1    Mar. 14, 2024

(30) Foreign Application Priority Data

Sep. 13, 2022   (JP) .................. 2022-144960

(51) Int. Cl.
*F16H 61/02* (2006.01)

(52) U.S. Cl.
CPC ..... *F16H 61/0204* (2013.01); *F16H 2312/09* (2013.01)

(58) Field of Classification Search
CPC ......... F16H 61/0204; F16H 2059/0021; F16H 2059/385; F16H 2059/082
See application file for complete search history.

(56) References Cited

U.S. PATENT DOCUMENTS

| | | | | |
|---|---|---|---|---|
| 5,957,808 A | * | 9/1999 | Iizuka | F16H 61/20 477/158 |
| 8,560,195 B2 | * | 10/2013 | Iwamoto | F16H 61/061 701/66 |
| 10,415,701 B2 | * | 9/2019 | Chimbe | F16H 61/08 |

FOREIGN PATENT DOCUMENTS

JP    2018-40422 A    3/2018

* cited by examiner

*Primary Examiner* — Huan Le
(74) *Attorney, Agent, or Firm* — TROUTMAN PEPPER HAMILTON SANDERS LLP

(57) ABSTRACT

A vehicle includes a power source, a transmission coupled to the power source, and a control unit. The transmission includes a torque converter and a hydraulic switching mechanism. A processor of the control unit is configured to execute in accordance with an instruction stored in a storage medium: obtaining RPM of a turbine shaft of the torque converter based on a unit time when the transmission is switched from neutral to forward driving or to reverse driving; determining whether the RPM is decreased by an amount greater than a predetermined amount of decrease based on the unit time; and reducing, if the RPM is decreased by an amount greater than the predetermined amount of decrease based on the unit time, pressure of oil to be supplied to an oil chamber of the hydraulic switching mechanism when the transmission switches to the same mode as the previously switched mode next time.

4 Claims, 3 Drawing Sheets

VEHICLE

CROSS-REFERENCE TO RELATED APPLICATION

The present application claims priority from Japanese Patent Application No. 2022-144960 filed on Sep. 13, 2022, the entire contents of which are hereby incorporated by reference.

BACKGROUND

The disclosure relates to a vehicle.

Typically, a vehicle includes a transmission. The transmission converts the revolutions per minute (RPM) of a power source and transmits the converted RPM to the wheels. The transmission may include a hydraulic mechanism for switching between forward/reverse driving operations of the vehicle. Such a hydraulic mechanism may also be called a switching mechanism in the disclosure. For example, a driver who drives the vehicle can select forward driving, reverse driving, and neutral by using a selector, such as a lever, a switch, or a paddle shifter. Japanese Unexamined Patent Application Publication No. 2018-40422 discloses a transmission including such a switching mechanism.

SUMMARY

An aspect of the disclosure provides a vehicle. The vehicle includes a power source, a transmission, and a control unit. The transmission is coupled to the power source and includes a torque converter and a hydraulic switching mechanism. The torque converter is coupled to the power source. The hydraulic switching mechanism is coupled to the torque converter and is configured to switch the transmission between a forward driving mode, a reverse driving mode, and a neutral mode. The control unit is configured to control the power source and the transmission. The control unit includes at least one processor and at least one storage medium. The at least one storage medium is configured to store an instruction to be executed by the at least one processor. The at least one processor is configured to execute in accordance with the instruction: obtaining a number of revolutions of a turbine shaft of the torque converter based on a unit time when the transmission is switched from the neutral mode to the forward driving mode or from the neutral mode to the reverse driving mode; determining whether the number of revolutions is decreased by an amount greater than a predetermined amount of decrease based on the unit time; and reducing, in a case where the number of revolutions is decreased by an amount greater than the predetermined amount of decrease based on the unit time, reducing pressure of oil to be supplied to an oil chamber of the hydraulic switching mechanism when the transmission switches to a mode identical to a previously switched mode next time.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

As the evaluation index of a switching mechanism, response quickness and the degree of shock, for example, may be used. When the switching mechanism is switched from neutral to forward driving or to reverse driving, for example, oil is supplied to a corresponding oil chamber. To reduce the response time, oil may be supplied to the oil chamber at high pressure to quickly fill the oil chamber with oil. However, the present inventor has found that the switching mechanism has a dead zone where the response time is no longer reduced even with an increased oil pressure. In the dead zone, if the switching mechanism keeps increasing the oil pressure to reduce the response time, the RPM may change drastically and the degree of shock may be elevated.

It is thus desirable to provide a vehicle that can reduce a shock occurring in a transmission.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
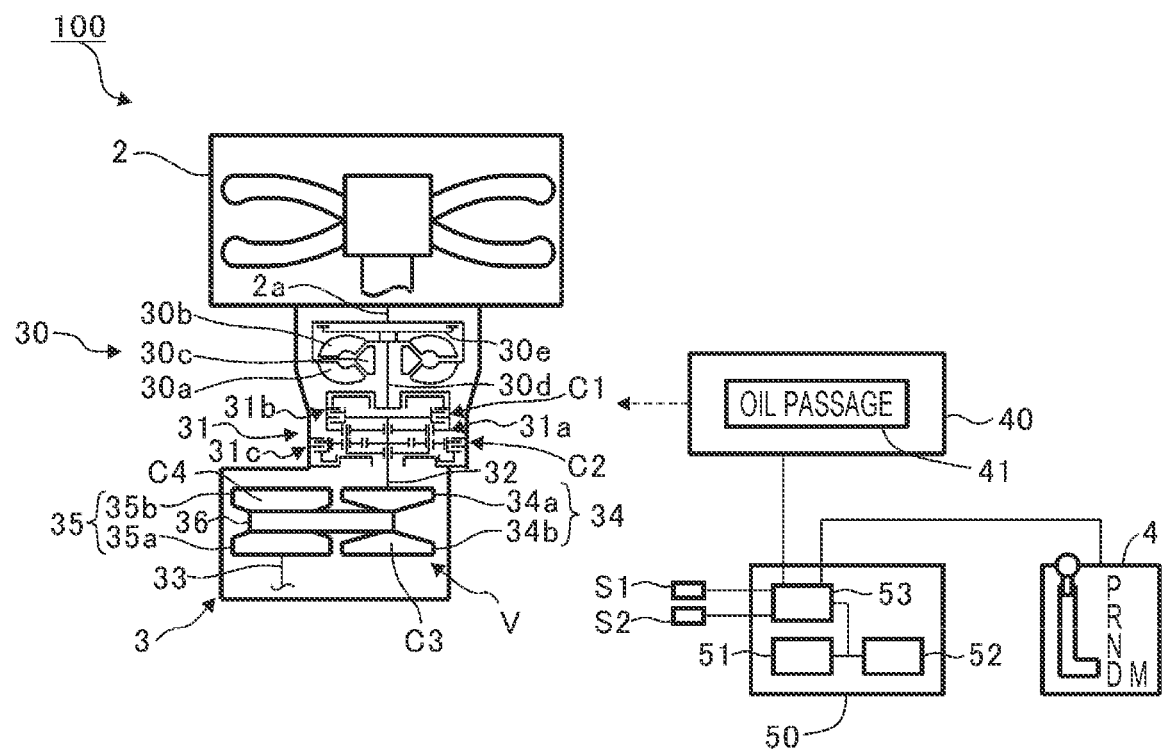
FIG. 1 is a schematic view illustrating a vehicle according to an embodiment of the disclosure.

FIG. 1 is a schematic view illustrating a vehicle 100 according to an embodiment. The vehicle 100 is, for example, a vehicle including an engine 2, such as a hybrid electric vehicle (HEV), a gasoline-powered automobile, or a diesel-powered automobile. In the embodiment, the vehicle 100 is a gasoline-powered automobile. The vehicle 100 includes the engine 2, a transmission 3, a select lever 4 (selector) of the transmission 3, and an electronic control unit (ECU) 50. In one embodiment, the engine 2 may serve as a "power source", and the ECU 50 may serve as a "control unit". The vehicle 100 may include various other elements.

The engine 2 can be a gasoline engine including one or more cylinders, for example. A crank shaft 2a of the engine 2 is coupled to the transmission 3. A crank angle sensor S1 measures the revolutions per minute (RPM) of the crank shaft 2a, that is, the RPM of the engine 2. The crank angle sensor S1 is coupled to the ECU 50 so that it can communicate with the ECU 50 and sends measurement data to the ECU 50.

The transmission 3 converts the RPM of the engine 2, that is, the RPM of the crank shaft 2a, and transmits the converted RPM to the wheels (not illustrated). Various types of transmissions can be used as the transmission 3. In the embodiment, the transmission 3 is a chain-based continuously variable transmission (CVT). The transmission 3 includes a torque converter 30, a switching mechanism 31, and a variator V. The variator V includes a primary shaft 32, a secondary shaft 33, a primary pulley 34, a secondary pulley 35, and a chain 36. The transmission 3 may also include other elements.

The torque converter 30 has a clutch function and a torque amplification function. The torque converter 30 includes a pump impeller 30a, a turbine runner 30b, a stator 30c, a turbine shaft 30d, and a lock-up clutch 30e. The torque converter 30 may also include other elements.

The pump impeller 30a is coupled to the crank shaft 2a of the engine 2. The pump impeller 30a is rotated together with the crank shaft 2a to generate an oil flow. The turbine runner 30b is disposed to face the pump impeller 30a. The turbine runner 30b receives rotating power of the pump impeller 30a via oil. The turbine runner 30b is coupled to the turbine shaft 30d. The turbine shaft 30d is rotated together with the turbine runner 30b. A rotational angle sensor S2 measures the RPM of the turbine shaft 30d. The rotational angle sensor S2 is coupled to the ECU 50 so that it can communicate with the ECU 50 and sends measurement data to the ECU 50.

The stator 30c is disposed between the pump impeller 30a and the turbine runner 30b. The stator 30c rectifies a flow output from the turbine runner 30b and returns the rectified flow to the pump impeller 30a. This can amplify torque.

The lock-up clutch 30e directly couples the crank shaft 2a to the turbine shaft 30d. When the lock-up clutch 30e is not engaged with the crank shaft 2a, the torque of the crank shaft 2a is amplified and is transmitted to the turbine shaft 30d. When the lock-up clutch 30e is engaged with the crank shaft 2a, the torque of the crank shaft 2a is directly transmitted to the turbine shaft 30d.

The switching mechanism 31 switches between forward/reverse rotations of the drive wheels. That is, the switching mechanism 31 switches between forward/reverse driving operations of the vehicle 100. For example, the switching mechanism 31 includes a double-pinion planetary pinion train 31a, a forward clutch 31b, and a reverse clutch 31c. The switching mechanism 31 controls the forward clutch 31b and the reverse clutch 31c so as to switch the transmission 3 between forward driving, reverse driving, and neutral.

The forward clutch 31b includes an oil chamber C1 which receives oil for connecting the forward clutch 31b. The reverse clutch 31c includes an oil chamber C2 which receives oil for connecting the reverse clutch 31c. The switching mechanism 31 is coupled to the primary shaft 32 of the variator V.

In the variator V, the primary pulley 34 is provided for the primary shaft 32. The primary pulley 34 includes a fixed sheave 34a and a movable sheave 34b. The fixed sheave 34a is fixed to the primary shaft 32. The movable sheave 34b faces the fixed sheave 34a. The movable sheave 34b is slidable in the axial direction of the primary shaft 32 and is unable to rotate with respect to the primary shaft 32. In the primary pulley 34, the distance between the fixed sheave 34a and the movable sheave 34b, that is, the pulley groove width, is changeable.

The secondary pulley 35 is provided for the secondary shaft 33. The secondary pulley 35 includes a fixed sheave 35a and a movable sheave 35b. The fixed sheave 35a is fixed to the secondary shaft 33. The movable sheave 35b faces the fixed sheave 35a. The movable sheave 35b is slidable in the axial direction of the secondary shaft 33 and is unable to rotate with respect to the secondary shaft 33. In the secondary pulley 35, the pulley groove width between the fixed sheave 35a and the movable sheave 35b is changeable.

The chain 36 is stretched between the primary pulley 34 and the secondary pulley 35. The variator V adjusts the pulley groove width of each of the primary pulley 34 and the secondary pulley 35 so as to change the ratio of the winding diameter (pulley ratio) of the chain 36 to each of the primary pulley 34 and the secondary pulley 35. In this manner, the variator V continuously varies the gear ratio.

The movable sheave 34b of the primary pulley 34 includes an oil chamber C3, while the movable sheave 35b of the secondary pulley 35 includes an oil chamber C4. Oil is supplied to each of the oil chambers C3 and C4 at a pressure to change the pulley ratio (gear ratio) and at a pressure to avoid a slippage of the chain 36.

The transmission 3 includes a valve body 40 for supplying oil to the oil chambers C1, C2, C3, and C4. For example, a control valve mechanism is built in the valve body 40. The control valve mechanism includes one or more spool valves provided in oil passages and one or more solenoid valves, for example. Hereinafter, a description will be given, assuming that the control valve mechanism includes one spool valve and one solenoid valve in the embodiment. The solenoid valve is used for moving the spool valve. The valve body 40 opens and closes a hydraulic oil passages by using the spool valve and the solenoid valve so as to supply oil from an oil pump (not illustrated) to each of the oil chambers C1, C2, C3, and C4 at an adjusted pressure. For example, the valve body 40 is coupled to the ECU 50 so that it can communicate with the ECU 50. The ECU 50 controls the solenoid valve of the valve body 40 to adjust the pressure of oil to be supplied to each of the oil chambers C1, C2, C3, and C4. The oil pressure to be applied to each of the oil chambers C1, C2, C3, and C4 can be calculated based on the pressure of oil supplied from the oil pump, for example. The valve body 40 includes an oil passage 41 among the oil passages used for adjusting the pressure of oil to be supplied to the oil chamber C1 of the forward clutch 31b and the oil chamber C2 of the reverse clutch 31c.

The select lever 4 has parking (P range), reverse driving (R range), neutral (N range), forward driving (D range), and manual (M range) modes. The select lever 4 may also have other ranges. In another embodiment, instead of the select lever 4, another type of selector, such as a switch or a paddle shifter, may be used.

When the D range of the select lever 4 is selected, the oil passage 41 supplies oil to the oil chamber C1 of the forward clutch 31b and also exhausts oil from the oil chamber C2 of the reverse clutch 31c. This connects the forward clutch 31b and disconnects the reverse clutch 31c. In this case, the rotation of the turbine shaft 30d is transmitted to the primary shaft 32, thereby moving the vehicle 100 forward.

When the R range of the select lever 4 is selected, the oil passage 41 supplies oil to the oil chamber C2 of the reverse clutch 31c and also exhausts oil from the oil chamber C1 of the forward clutch 31b. This disconnects the forward clutch 31b and connects the reverse clutch 31c. In this case, the planetary pinion train 31a starts to operate and the rotation of the turbine shaft 30d is transmitted to the primary shaft 32 in the reverse direction, thereby moving the vehicle 100 backward.

When the N range or the P range of the select lever 4 is selected, the oil passage 41 exhausts oil from each of the oil chamber C1 of the forward clutch 31b and the oil chamber C2 of the reverse clutch 31c. This disconnects the forward clutch 31b and the reverse clutch 31c. In this case, the turbine shaft 30d is disconnected from the primary shaft 32 and the rotation of the turbine shaft 30d is not transmitted to the primary shaft 32.

The ECU 50 includes one or more processors 51, such as a central processing unit (CPU), one or more storage mediums 52, such as a read only memory (ROM) and a random access memory (RAM), and one or more connectors 53. Hereinafter, a description will be given, assuming that the ECU 50 includes one processor 51, one storage medium 52, and one connector 53 in the embodiment. The ECU 50 may also include other elements. The elements of the ECU 50 are coupled to each other via a bus so that they can communicate with each other. The storage medium 52 includes one or more programs to be executed by the processor 51. Each program includes instructions to be given to the processor 51. The operations of the ECU 50 described in the disclosure are implemented as a result of the processor 51 executing instructions stored in the storage medium 52. The ECU 50 is coupled to the elements of the vehicle 100 via the connector 53 so that it can communicate with the elements of the vehicle 100.

Figure 2:
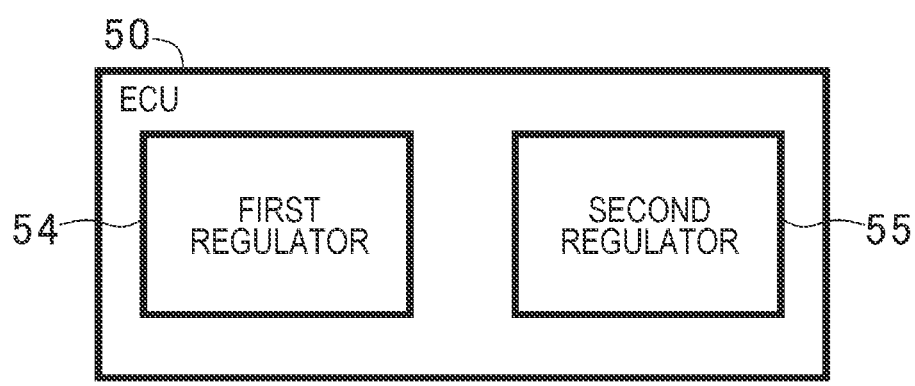
FIG. 2 is a functional block diagram of an electronic control unit (ECU)

FIG. 2 is a functional block diagram of the ECU 50. The processor 51 serves as a first regulator 54 and a second regulator 55. The first regulator 54 regulates the response quickness and the second regulator 55 regulates the degree of shock in each of the cases where the select lever 4 is switched from the N range to the D range and where the select lever 4 is switched from the N range to the R range.

Figure 3A:
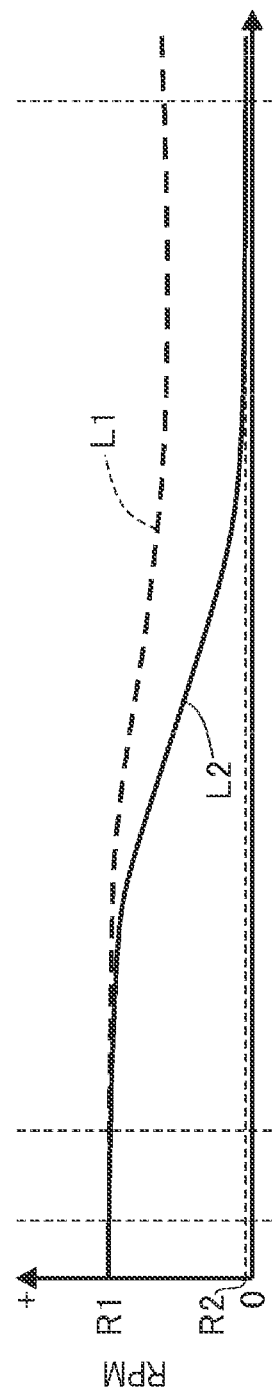
FIGS. 3A, 3B, and 3C are graphs illustrating examples of the transitions of various parameters when a transmission is switched from neutral to forward driving.
Figure 3B:
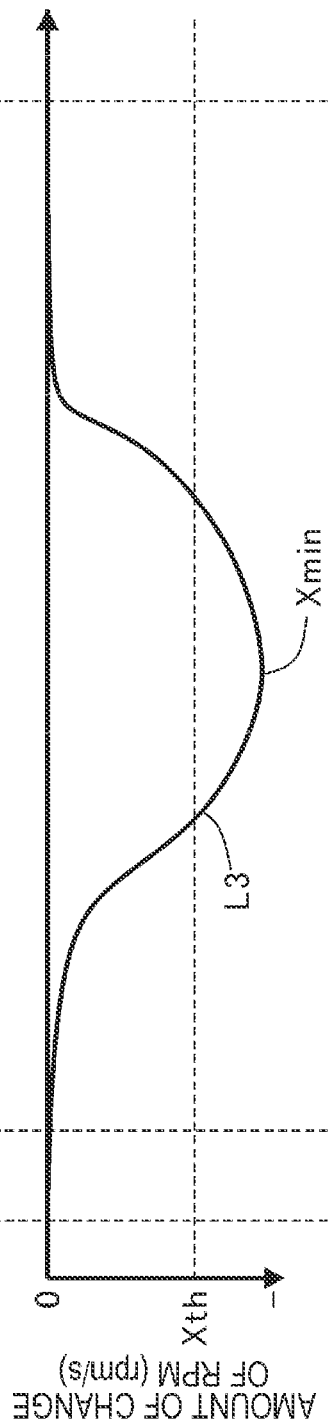
Figure 3C:
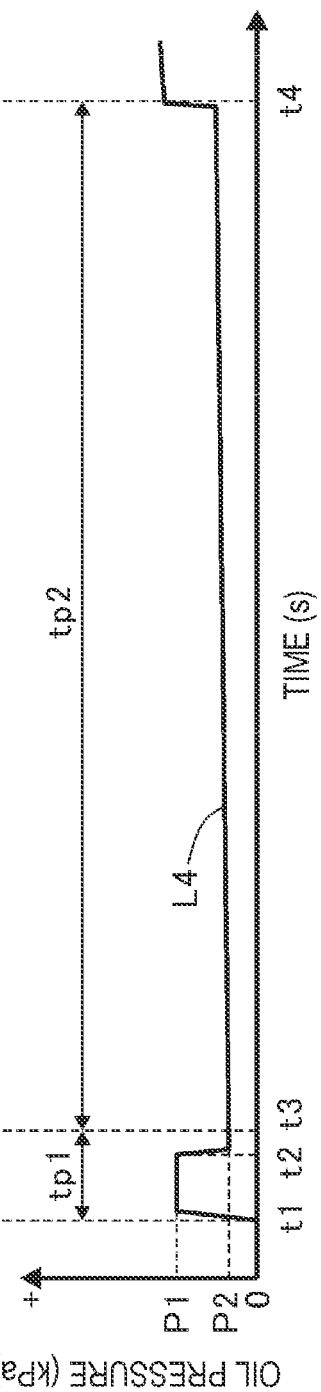

FIGS. 3A, 3B, and 3C are graphs illustrating examples of the transitions of various parameters when the transmission 3 is switched from neutral to forward driving, that is, when the select lever 4 is switched from the N range to the D range. In this example, the oil passage 41 supplies oil to the oil chamber C1 of the forward clutch 31$b$. When the transmission 3 is switched from neutral to reverse driving, that is, when the select lever 4 is switched from the N range to the R range, the various parameters also change similarly to those in FIGS. 3A, 3B, and 3C. In this case, however, the oil passage 41 supplies oil to the oil chamber C2 of the reverse clutch 31$c$.

In FIGS. 3A, 3B, and 3C, the horizontal axis indicates the time.

In FIG. 3A, the vertical axis indicates RPM. The broken line L1 indicates the RPM of the crank shaft 2$a$, that is, the RPM of the engine 2. Hereinafter, the RPM of the crank shaft 2$a$ (engine 2) may also be called the RPM L1 of the crank shaft 2$a$ (engine 2). The RPM L1 of the crank shaft 2$a$ can be measured by the crank angle sensor S1. The solid line L2 indicates the RPM of the turbine shaft 30$d$. Hereinafter, the RPM of the turbine shaft 30$d$ may also be called the RPM L2 of the turbine shaft 30$d$. The RPM L2 of the turbine shaft 30$d$ can be measured by the rotational angle sensor S2, for example.

In FIG. 3B, the vertical axis indicates the amount of change (decrease) of the RPM per unit time, for example, per second. The solid line L3 indicates the amount of change of the RPM L2 of the turbine shaft 30$d$ in FIG. 3A per unit time. Hereinafter, the amount of change of the RPM L2 of the turbine shaft 30$d$ per unit time may also be called the amount of change L3 of the RPM L2. The amount of change L3 of the RPM 2 can be calculated from the RPM L2 illustrated in FIG. 3A.

In FIG. 3C, the vertical axis indicates the oil pressure. The solid line L4 indicates the pressure of oil supplied from the oil passage 41 to the oil chamber C1 of the forward clutch 31$b$. The solid line L4 can be calculated based on the pressure of oil supplied from the oil pump to the oil passage 41, for example.

In the example in FIGS. 3A, 3B, and 3C, at time t1, the select lever 4 is switched from the N range to the D range. Prior to time t1, the transmission 3 is at the neutral position and the engine 2 is at idle. In this state, the turbine shaft 30$d$ is not coupled to the wheels and is rotated substantially together with the engine 2. Accordingly, as illustrated in FIG. 3A, prior to time t1, both of the RPM L1 of the engine 2 and the RPM L2 of the turbine shaft 30$d$ are maintained at R1.

When the select lever 4 is switched from the N range to the D range at time t1, the oil passage 41 starts to supply oil to the oil chamber C1. Then, as illustrated in FIG. 3C, the oil pressure rises up to P1 and is maintained at P1. Then, at time t2, the oil pressure drops to P2. The reason why the oil pressure changes in this manner is that precharge control is performed to fill the oil chamber C1 with oil. At time t2, at a timing at which the oil chamber C1 becomes full of oil, the pressure drops to P2. The pressure then starts to gradually rise from time t2.

Then, at time t3, when a sufficient amount of oil is supplied to the oil chamber C1, the forward clutch 31$b$ is connected. This couples the turbine shaft 30$d$ to the wheels and torque is applied from the wheels to the turbine shaft 30$d$ as a load. Accordingly, as illustrated in FIG. 3A, the RPM L2 of the turbine shaft 30$d$ starts to decrease from time t3. Likewise, the RPM L1 of the engine 2 also starts to decrease from time t3. In this state, the amount of change L3 of the RPM L2 of the turbine shaft 30$d$ starts to decrease, as illustrated in FIG. 3B.

Then, at time t4, the RPM L2 of the turbine shaft 30$d$ converges into R2, as illustrated in FIG. 3A. In this state, the amount of change L3 of the RPM L2 of the turbine shaft 30$d$ returns to zero, as illustrated in FIG. 3B.

In the above-described graphs, the response time tp1 from time t1 to time t3 represents the length of time from when the select lever 4 is switched from the N range to the D range until the RPM L2 of the turbine shaft 30$d$ starts to decrease, that is, the length of time taken to connect the forward clutch 31$b$. Examining the response time tp1 can evaluate the response quickness of the transmission 3.

To reduce the response time tp1, the oil pressure may be increased in the following manner, for example. Setting the pressure P1 of oil to be supplied to the oil chamber C1 to be high can decrease the length of time taken to fill the oil chamber C1 with oil. Setting the pressure P2 of oil to be supplied to the oil chamber C1 to be high can connect the forward clutch 31$b$ quickly. However, the present inventor has found that the transmission 3 has a dead zone where the response time tp1 no longer changes even with an increased pressure P2 if the pressure P1 is set to be high in excess of a certain value. In the dead zone, if the pressure P2 is increased to reduce the response time tp1, the amount of change L3 of the RPM L2 may change drastically in the negative direction and the degree of shock may be elevated.

Based on the above-described findings, in the embodiment, the processor 51 serves as the first regulator 54 to regulate the response quickness and also serves as the second regulator 55 to regulate the degree of shock in each of the cases where the select lever 4 is switched from the N range to the D range and where the select lever 4 is switched from the N range to the R range.

When the processor 51 serves as the first regulator 54, it determines whether the response time tp1 is smaller than a predetermined target value. For example, if the response time tp1 is not smaller than the target value, the processor 51 adjusts (increases or decreases) one or both of the pressure P1 and the pressure P2. This can reduce the response time tp1. The target value is stored in the storage medium 52, for example.

When the processor 51 serves as the second regulator 55, it determines whether the RPM L2 of the turbine shaft 30$d$ is decreased by an amount greater than a predetermined threshold (predetermined amount of decrease) Xth per unit time. In other words, the processor 51 determines whether the amount of decrease L3 of the RPM L2 of the turbine shaft 30*d* per unit time is greater than the threshold Xth. In one example, the processor 51 determines whether the minimum value Xmin of the amount of change L3 during a period tp2 for which the RPM L2 of the turbine shaft 30*d* keeps changing is smaller than the threshold Xth. The threshold Xth may be determined by experiment or analysis. The threshold Xth may be set as a value that brings about the greatest permissible degree of shock. The threshold Xth is stored in the storage medium 52, for example.

If the minimum value Xmin of the amount of change L3 is smaller than the threshold Xth as illustrated in FIG. 3B, the processor 51 reduces the pressure P2 of oil when the select lever 4 switches to the same mode as the previously switched mode next time. In the example of FIGS. 3A, 3B, and 3C, when the select lever 4 switches from the N range to the D range next time, the processor 51 reduces the pressure P2 of oil to be supplied to the oil chamber C1.

In one example, the processor 51 calculates the difference between a target amount of decrease of the RPM L2 of the turbine shaft 30*d* per unit time illustrated in FIG. 3B and an actual amount of decrease of the RPM L2 per unit time illustrated in FIG. 3B. For example, the processor 51 calculates the difference between the threshold Xth and the minimum value Xmin of the amount of change L3.

Then, the processor 51 multiplies the calculated difference by a predetermined first gain to calculate a correction value. The calculated correction value is stored in the storage medium 52. When the select lever 4 switches from the N range to the D range next time, the correction value is subtracted from the value of the pressure P2 and the resulting value is used as the adjusted pressure P2. The first gain may be determined by experiment or analysis so that the pressure P2 can be suitably decreased, for example. The first gain is stored in the storage medium 52, for example.

When the transmission 3 is switched from neutral to reverse driving, that is, when the select lever 4 is switched from the N range to the R range, the correction value is also calculated in a similar manner. In this case, however, a second gain, which is different from the first gain, is used. The reason for this is that the gear ratio, for example, is different between the D range and the R range. A suitable gain is thus calculated in advance by experiment or analysis, for example, as each of the first gain and the second gain. The second gain is stored in the storage medium 52, for example. When the select lever 4 switches from the N range to the R range next time, the value obtained by subtracting a calculated correction value from the value of the pressure P2 is used as the adjusted pressure P2.

An operation of the ECU 50 will now be discussed below.

Figure 4:
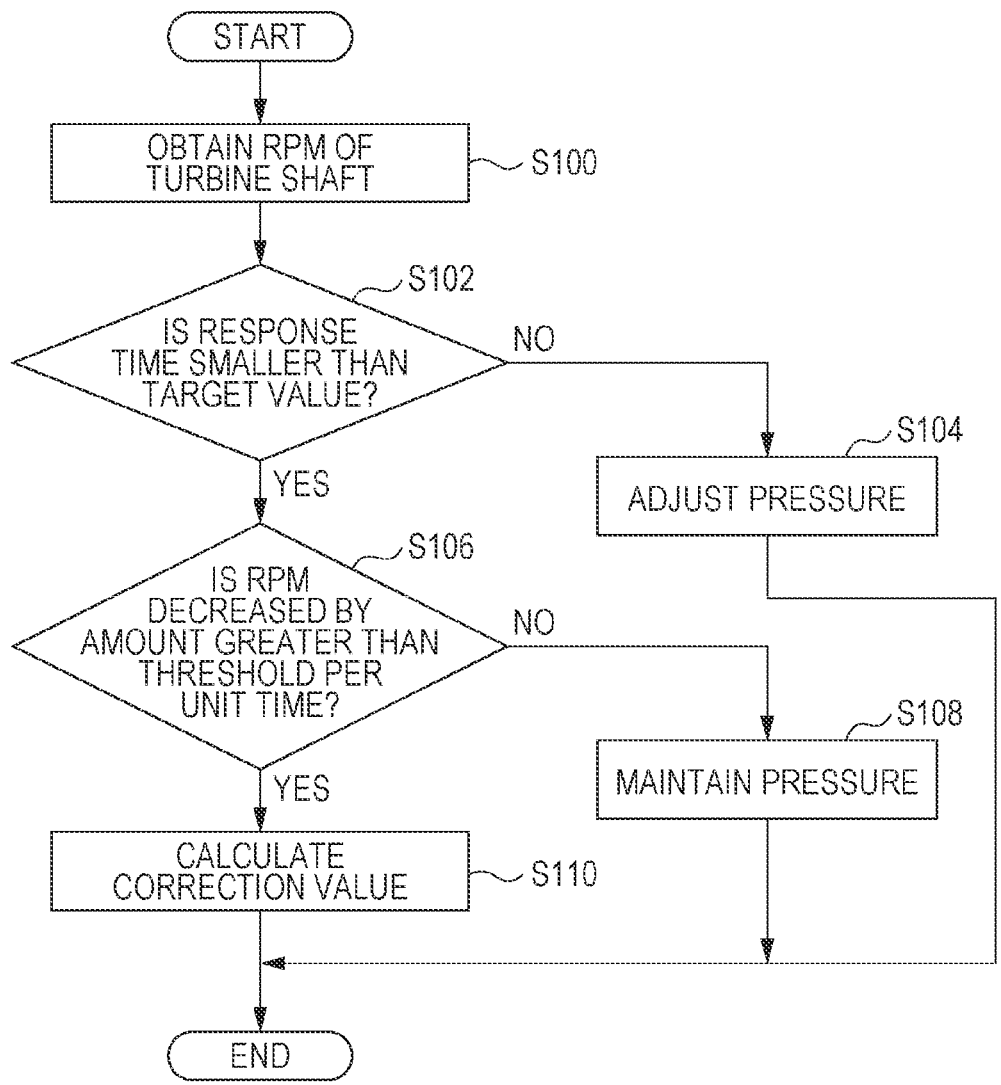
FIG. 4 is a flowchart illustrating an operation of the ECU.

FIG. 4 is a flowchart illustrating an operation of the ECU 50. The operation illustrated in FIG. 4 is started in each of the cases where the select lever 4 is switched from the N range to the D range and where the select lever 4 is switched from the N range to the R range.

In step S100, the processor 51 of the ECU 50 obtains the RPM L2 of the turbine shaft 30*d*. For example, the processor 51 receives the RPM L2 of the turbine shaft 30*d* from the rotational angle sensor S2.

In step S102, based on the transition of the obtained RPM L2 of the turbine shaft 30*d*, the processor 51 determines whether the response time tp1 is smaller than a target value.

If the response time tp1 is not smaller than the target value (NO in step S102), the processor 51 adjusts one or both of the pressure P1 and the pressure P2 in step S104 and completes the operation.

If the response time tp1 is smaller than the target value (YES in step S102), the processor 51 determines in step S106, based on the transition of the obtained RPM L2 of the turbine shaft 30*d*, whether the RPM L2 is decreased by an amount greater than the threshold Xth per unit time. In one example, the processor 51 determines whether the minimum value Xmin of the amount of change L3 of the RPM L2 during the period tp2 for which the RPM L2 of the turbine shaft 30*d* keeps changing is smaller than the threshold Xth.

If the RPM L2 is not decreased by an amount greater than the threshold Xth per unit time (NO in step S106), the processor 51 maintains the pressure P2 in step S108 and completes the operation.

If the RPM L2 is decreased by an amount greater than the threshold Xth per unit time (YES in step S106), the processor 51 calculates a correction value in step S110. In one example, the processor 51 calculates the difference between the threshold Xth and the minimum value Xmin and multiplies the calculated difference by the first gain. If the select lever 4 is switched from the N range to the R range, the processor 51 multiples the calculated difference by the second gain. Then, the processor 51 completes the operation. The calculated correction value is stored in the storage medium 52. When the select lever 4 switches to the same mode as the previously switched mode next time, the value obtained by subtracting the correction value from the value of the pressure P2 is used as the adjusted pressure P2.

The vehicle 100 configured as described above includes the engine 2, the transmission 3 coupled to the engine 2, and the ECU 50 configured to control the engine 2 and the transmission 3. The transmission 3 includes the torque converter 30 coupled to the engine 2 and the hydraulic switching mechanism 31 coupled to the torque converter 30. The hydraulic switching mechanism 31 is configured to switch the transmission 3 between a forward driving mode, a reverse driving mode, and a neutral mode. The ECU 50 includes one or more processors 51 and one or more storage mediums 5. The storage medium 5 stores an instruction to be executed by the processor 51. The processor 51 is configured to execute in accordance with the instruction: obtaining the RPM L2 of the turbine shaft 30*d* of the torque converter 30 when the transmission 3 is switched from the neutral mode to the forward driving mode or from the neutral mode to the reverse driving mode; determining whether the RPM L2 is decreased by an amount greater than a predetermined amount of decrease (threshold Xth) per unit time; and reducing, if the RPM L2 is decreased by an amount greater than the predetermined amount of decrease (threshold Xth) per unit time, the pressure P2 of oil to be supplied to the oil chambers C1 and C2 of the hydraulic switching mechanism 31 when the transmission 3 switches to the same mode as the previously switched mode next time. With this configuration, the pressure P2 can be adjusted so that the amount of change L3 of the RPM L2 of the turbine shaft 30*d* becomes smaller than the threshold Xth that brings about the greatest permissible degree of shock. It is thus possible to reduce a shock occurring in the transmission 3.

In the vehicle 100, reducing the pressure P2 of oil includes: calculating a difference between a target amount of decrease (threshold Xth, for example) of the RPM L2 per unit time and the actual amount of decrease (minimum value Xmin, for example) of the RPM L2 per unit time; calculating a correction value by multiplying the calculated difference by a predetermined gain; and subtracting the correction value from the current value of the pressure P2 of oil. The predetermined gain includes a first gain and a second gain. The first gain is used for calculating the correction value when the transmission 3 is switched from the neutral mode to the forward driving mode. The second gain is used for calculating the correction value when the transmission 3 is switched from the neutral mode to the reverse driving mode. The second gain is different from the first gain. With this configuration, a suitable gain can be set in accordance with whether the transmission 3 is switched from the neutral mode to the forward driving mode or to the reverse driving mode.

In the vehicle 100, the processor 51 is configured to execute in accordance with the instruction: determining whether the response time tp1 is smaller than a predetermined target value. The response time tp1 is a time from when switching the transmission 3 from the neutral mode to the forward driving mode or to the reverse driving mode is requested until when the RPM L2 starts to decrease. Determining whether the RPM L2 is decreased by an amount greater than the predetermined threshold Xth per unit time is executed when the response time tp1 is smaller than the predetermined target value. This configuration makes it possible to regulate both of the response quickness and the degree of shock of the transmission 3.

The embodiment has been discussed with reference to the accompanying drawings. However, the disclosure is not restricted to the above-described embodiment. Obviously, practitioners skilled in the art may conceive various modifications and variations within the scope and spirit of the disclosure and it is understood that such modifications and variations are also encompassed in the technical scope of the disclosure. The steps of the operation of the ECU 50 discussed in the embodiment may not necessarily be executed in the above-described order and may be executed in a different order if there is no inconsistencies in terms of technical aspects.

In one example, in the above-described embodiment, calculating the adjusted pressure P2 of oil to be used for the next time includes: calculating the difference between the target amount of decrease (threshold Xth, for example) of the RPM L2 per unit time and the actual amount of decrease (minimum value Xmin, for example) of the RPM L2 per unit time; calculating a correction value by multiplying the calculated difference by a predetermined gain; and subtracting the correction value from the value of the current pressure P2 of oil. In another embodiment, however, a different expression may be used for calculating the adjusted pressure P of oil for the next time.

In another example, in the above-described embodiment, the value obtained by subtracting the correction value from the value of the current pressure P2 is used as the adjusted pressure P2 for the next time. In another embodiment, however, the correction value may be a ratio with respect to the current pressure P2 (0<correction value<1). For example, the value obtained by multiplying the current pressure P2 by the correction value may be used as the adjusted pressure P2 for the next time.

In another example, in the above-described embodiment, the correction value is calculated by a linear expression using the difference between the target amount of decrease and the actual amount of decrease. In another embodiment, however, the correction value may be calculated by another n-th order expression, such as a quadratic expression, using the difference between the target amount of decrease and the actual amount of decrease.

The ECU 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECU 50 including the processor 51 serving as the first regulator 54 and the second regulator 55 in FIGS. 1 and 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

The invention claimed is:

1. A vehicle comprising:
a power source;
a transmission coupled to the power source; and
a control unit configured to control the power source and the transmission, wherein
the transmission comprises
a torque converter coupled to the power source, and
a hydraulic switching mechanism coupled to the torque converter and configured to switch the transmission between a forward driving mode, a reverse driving mode, and a neutral mode,
the control unit comprises
at least one processor, and
at least one storage medium configured to store an instruction to be executed by the at least one processor,
the at least one processor is configured to execute, in accordance with the instruction,
obtaining a number of revolutions of a turbine shaft of the torque converter based on a unit time when the transmission is switched from the neutral mode to the forward driving mode or from the neutral mode to the reverse driving mode,
determining whether the number of revolutions is decreased by an amount greater than a predetermined amount of decrease based on the unit time, and
reducing, in a case where the number of revolutions is decreased by an amount greater than the predetermined amount of decrease based on the unit time, pressure of oil to be supplied to an oil chamber of the hydraulic switching mechanism when the transmission next switches to a mode that is the same as a mode the transmission previously switched to.

2. The vehicle according to claim 1, wherein:
reducing the pressure of oil comprises
calculating a difference between a target amount of decrease of the number of revolutions based on the unit time and an actual amount of decrease of the number of revolutions based on the unit time,
calculating a correction value by multiplying the difference by a predetermined gain, and
subtracting the correction value from a current value of the pressure of oil; and the predetermined gain includes
a first gain to be used for calculating the correction value when the transmission is switched from the neutral mode to the forward driving mode, and
a second gain to be used for calculating the correction value when the transmission is switched from the neutral mode to the reverse driving mode, the second gain being different from the first gain.

3. The vehicle according to claim 1, wherein:
the at least one processor is configured to execute, in accordance with the instruction,
determining whether a response time is smaller than a predetermined target value, the response time being a length of time from when a switching the transmission from the neutral mode to the forward driving mode or to the reverse driving mode is requested until when the number of revolutions starts to decrease; and
determining whether the number of revolutions is decreased by an amount greater than the predetermined amount of decrease based on the unit time is executed when the response time is smaller than the predetermined target value.

4. The vehicle according to claim 2, wherein:
the at least one processor is configured to execute, in accordance with the instruction,
determining whether a response time is smaller than a predetermined target value, the response time being a length of time from when a switching the transmission from the neutral mode to the forward driving mode or to the reverse driving mode is requested until when the number of revolutions starts to decrease; and
determining whether the number of revolutions is decreased by an amount greater than the predetermined amount of decrease based on the unit time is executed when the response time is smaller than the predetermined target value.

* * * * *